INVENTORS
DAVID W. SALLBERG
DONALD W. ERICSON
ROBERT L. ZIMMERMAN

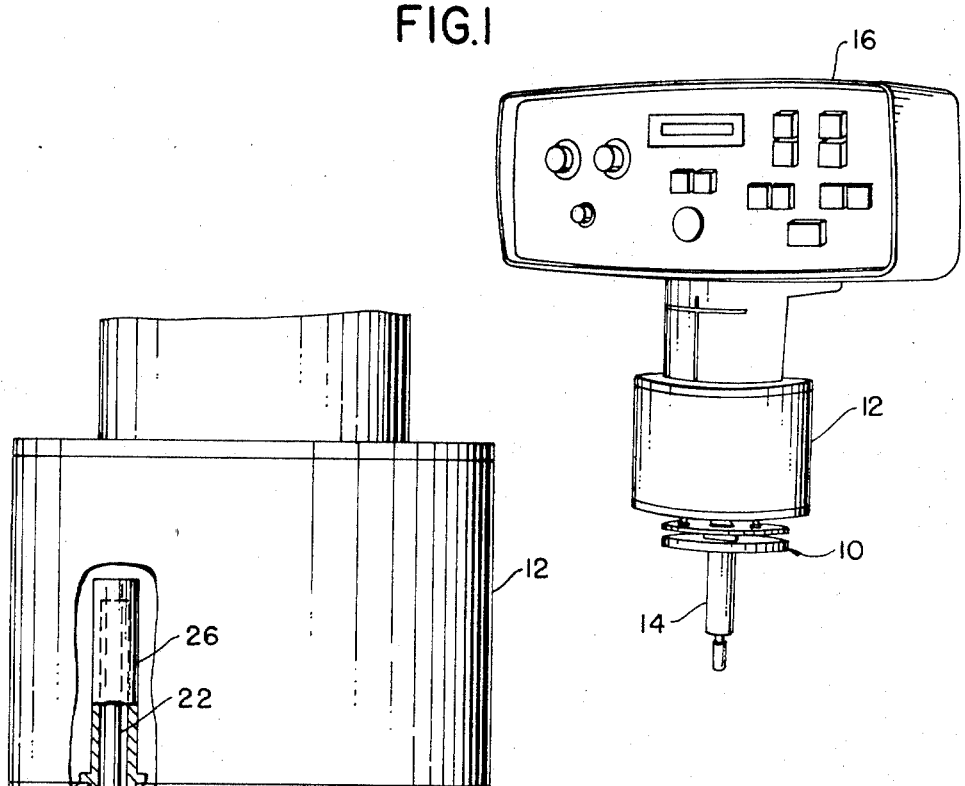
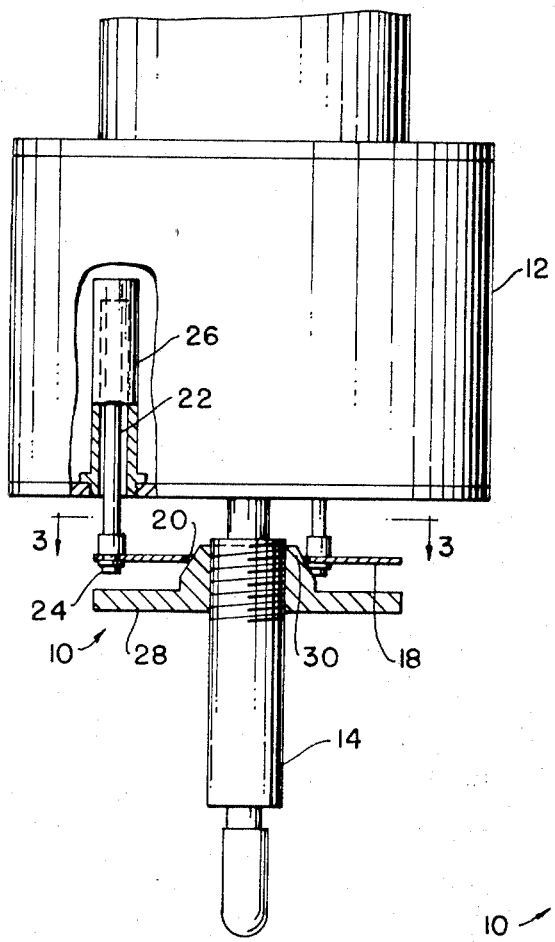
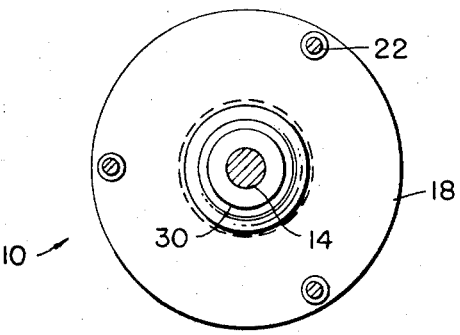
FIG.1
FIG.2
FIG.3
INVENTORS
DAVID W. SALLBERG
DONALD W. ERICSON
ROBERT L. ZIMMERMAN Sept. 8, 1970   D. W. SALLBERG ET AL   3,527,117
STRUCTURE FOR AND METHOD OF TRACING STYLUS DEFLECTION LIMITING Filed May 28, 1968   2 Sheets-Sheet 2

BY *Whittemore*
*Hulbert & Belknap* ATTORNEYS

United States Patent Office 3,527,117
Patented Sept. 8, 1970

3,527,117
STRUCTURE FOR AND METHOD OF TRACING
STYLUS DEFLECTION LIMITING
David W. Sallberg, Farmington, Donald W. Ericson,
Birmingham, and Robert L. Zimmerman, Royal Oak,
Mich., assignors to Pegasus Laboratories, Inc., Berkley,
Mich., a corporation of Michigan
Filed May 28, 1968, Ser. No. 732,578
Int. Cl. B23q 35/00; F16h 53/00
U.S. Cl. 74—569
10 Claims

ABSTRACT OF THE DISCLOSURE

A method of operating a tracing stylus and structure for accomplishing the method is disclosed. In accordance with the method of operating the tracing stylus a limiting deflection for the tracing stylus is first selected, the tracing stylus is then deflected as desired up to the selected limit and if necessary the selected limit of deflection of the tracing stylus is knowingly exceeded.

Structure for accomplishing the indicated method in one embodiment includes a ring of spring steel having an iris therein through which the tracing stylus extends, which ring is resiliently mounted and a conical abutment adjustably secured to the tracing stylus for movement axially thereof into and out of the iris. In a second embodiment the structure for limiting the deflection of a tracing stylus comprises an adjustable shutter having an iris surrounding the tracing stylus and a fixed conical abutment on the stylus.

BACKGROUND OF THE INVENTION

Field of the invention

The invention relates to a servo controlled tracing system having a stylus and refers more specifically to deflection limiting structure for the stylus of the tracing system including means for adjusting the limit of stylus deflection and for overriding the adjusted deflection limit and the corresponding method of limiting the deflection of the stylus.

Description of the prior art

Electronic servo controlled tracing systems for duplicating models with machine tools sometimes have available a mode of operation called, "pencil trace," wherein an operator controls the movement of a machine tool by finger pressure on the tracing stylus. The deflection of the tracing stylus by the finger pressure is sensed by electrical transducers and motion of the machine is produced in response to the transducers signals. The machine motion or feed rate is proportional to the stylus deflection and thus can be controlled by the amount of deflection.

In the past it has been possible to deflect the stylus to the extent whereby the servo control system or the machine controlled thereby is overdriven and damaged. At present pencil tracing with the servo systems is an art in which only experienced operators are capable of producing maximum machine feed rates in pencil trace operations without equipment damage. No deflection limiting equipment for pencil trace operation has been previously provided.

In accordance with the invention there is provided a method of pencil trace operation which can be performed by unskilled operators without damage to the equipment used, including the steps of limiting the maximum stylus deflection possible without knowingly overdriving the equipment, adjusting the stylus deflection limits and when considered necessary overriding the stylus deflection limits.

The structure provided in accordance with the invention for performing the method of the invention includes in one embodiment a resiliently supported ring having an iris therein through which the stylus extends and an adjustable conical abutment on the stylus movable into and out of the iris. In another embodiment the structure provided for adjustably limiting the deflection of the stylus and permitting overriding of the limit of the stylus deflection comprises an adjustable shutter having an iris through which the stylus extends and a fixed conical abutment on the stylus extending through the iris.

BRIEF DESCRIPTION OF THE DRAWINGS

FIG. 1 is a perspective view of a servo system control panel including a tracing stylus connected thereto and tracing stylus deflection limiting structure constructed in accordance with the invention operably associated therewith.

FIG. 2 is an enlarged partially broken away, partial elevation view of the tracing stylus and tracing stylus deflection limiting structure illustrated in FIG. 1.

FIG. 3 is a partial cross section of the tracing stylus and tracing stylus deflection limiting structure illustrated in FIG. 2 taken substantially on the line 3—3 in FIG. 2.

DESCRIPTION OF THE PREFERRED EMBODIMENTS

Figure 4:
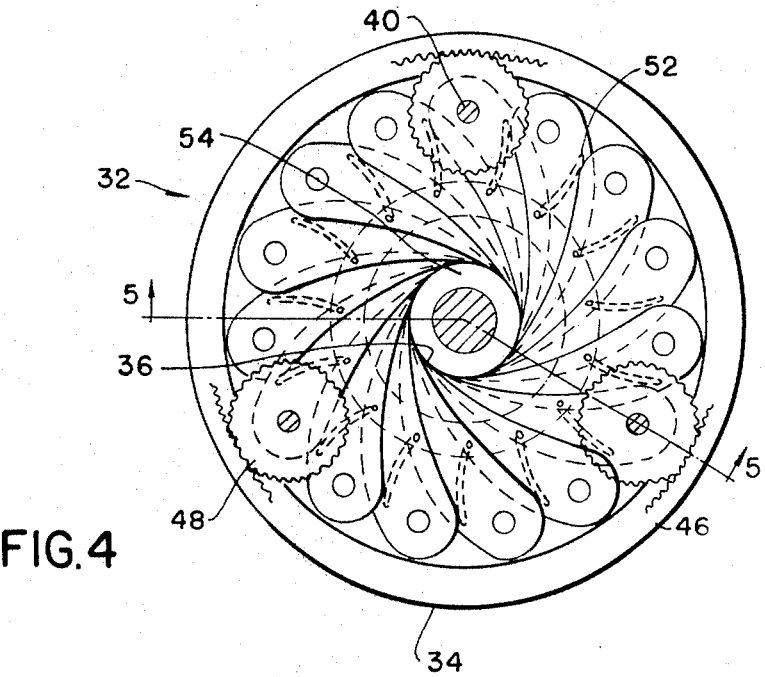
FIG. 4 is an enlarged partial cross section view of a second embodiment of tracing stylus deflection limiting structure constructed in accordance with the invention similar to the section view of FIG. 3 and taken substantially on the line 4—4 in FIG. 5.

As shown in FIG. 1, the stylus deflection limiting structure 10 is secured to the housing 12 supporting the tracing stylus 14 from a tracing system control panel 16. The stylus 14 and tracing system controls for use therewith are items of commerce and will not therefore be considered in detail herein. In this regard, the model No. 527 tracing system control and the tracing stylus associated therewith obtainable from Pegasus Laboratories, Inc., Berkley, Mich. is referenced. Other similar tracing system controls and tracing styluses are available in the art.

The tracing stylus deflection limiting structure 10, as illustrated in more detail in FIG. 2, includes the flat ring 18 which may be constructed of spring steel and which has an opening or iris 20 in the center thereof through which the tracing stylus 14 extends. The ring 18 is supported at three angularly separated locations therearound on the rods 22 connected to the ring 18 by convenient means, such as bolts 24 at one end extending through openings in the ring 18 and into threaded holes in the ends of the rods 22. The other ends of the rods 22 are secured in the opposite ends of the tubes 26. The tubes 26 are in turn threaded into the stylus housing 12, as shown.

A deflection adjusting disk 28 having a conical abutment 30 thereon is threadedly secured to the stylus 14 for movement axially thereof into and out of the iris 20, whereby the deflection limits of the stylus 14 are adjusted.

In operation of the embodiment of the stylus deflection limiting structure 10, illustrated in FIGS. 1 through 3, a machine operator deflects the stylus 14 manually in, for example, the plane of the ring 18 or axially of the stylus 14 toward the housing 12 in the usual manner to effect movement of a machine tool controlled thereby within the limits set by the ring 18. When the stylus 14 is moved so that the conical abutment 30 contacts the ring 18, the operator immediately realizes that the acceptable limit of deflection of the stylus 14 and therefore the operating limits of the control system or the machine controlled have been reached. If, for some reason, the operator consciously desires to deflect the stylus 14 a greater distance, the spring steel of the ring 18 and the mounting of the ring 18 on the rods 22 suspended in the tubes 26 permit overriding of the adjusted stylus deflection limits with return of the stylus to the adjusted limits when overriding pressure on the stylus is released.

Figure 5:
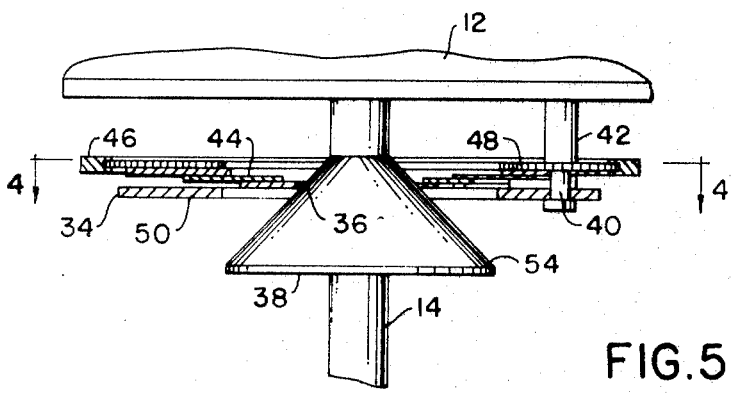
FIG. 5 is a partially broken away elevation view of the embodiment of the tracing stylus deflection limiting structure illustrated in FIG. 4 taken substantially on the line 5—5 in FIG. 4.

The embodiment of the stylus deflection limiting structure 32, illustrated in FIG. 4, includes a camera type shutter 34 defining a variable radius iris 36 centrally thereof. A fixed conical abutment 38 is rigidly secured to the stylus 14 which extends through the shutter iris, as shown best in FIG. 5.

The shutter 34 is suspended on rods 40 extending through tubes 42 connected to the housing 12. The shutter 34, as indicated, is similar to a standard camera shutter and includes an outer internally toothed ring 46 carried by and in mesh with the gears 48 which in turn are positioned on rods 40 for rotation therearound. The gears 48 are rigidly secured to selected ones of the diaphragm leaves 44, whereby on rotation of the ring 46, the gears 48 and thus the selected diaphragm leaves are rotated about the axis of the rods 40. The other diaphragm leaves which are pivoted on the annular plate 50, also supported on rods 40, are secured together with the selected leaves for movement by pin and slot structures 52 operable between the adjacent shutter diaphragm leaves.

Thus, in operation, the diameter of the iris 36 is selected on rotation of the outer ring 46. After the iris diameter has been selected, the stylus 14 may be deflected as before until the conical abutment surface 54 engages the shutter diaphragm as a normal operating limit. Due to the spring steel material of the shutter diaphragm leaves and the suspension of the shutter on the rods 40 in tubes 42, the limit of movement of the stylus 14 may be overridden in cases where it is desired to knowingly exceed the normal driving limits of the servo control or machine controlled thereby, as before.

While two embodiments of the present invention have been considered in detail, it will be understood that other embodiments and modifications are contemplated. It is the intention to include all embodiments and modifications as are defined by the appended claims within the scope of the invention.

What we claim as our invention is:

1. A tracing stylus and means operably associated with the tracing stylus for limiting the deflection of the stylus including a ring having an iris therein through which the tracing stylus extends engageable with the tracing stylus to limit the deflection thereof.

2. Structure as set forth in claim 1 wherein the means for limiting the deflection of the tracing stylus is adjustable.

3. Structure as set forth in claim 2 wherein the means for limiting the deflection of the stylus comprises a shutter having a radially adjustable iris through which the stylus extends.

4. Structure as set forth in claim 3 and further including resilient mounting means for the shutter and a fixed conical abutment on the stylus engageable with the periphery of the iris of the shutter.

5. Structure as set forth in claim 1 wherein the means for limiting the tracing stylus deflection further includes an adjustable abutment secured to the stylus for engagement with the ring.

6. Structure as set forth in claim 5 wherein the ring is resilient and further including a resilient mounting for the ring whereby the deflection limit of the stylus may be overridden.

7. Structure as set forth in claim 1 wherein the means for limiting the stylus deflection is adjustable and further including means operably associated with the means for limiting stylus deflection permitting overriding the means for limiting stylus deflection.

8. The method of actuating a tracing stylus comprising deflecting the stylus in a desired direction and limiting the stylus deflection when a desired maximum deflection of the stylus in the desired direction has been accomplished.

9. The method as set forth in claim 8 and further including selecting the deflection limit of the stylus before deflecting the stylus.

10. The method as set forth in claim 9 and further including overriding the selected limit of deflection of the stylus.

References Cited

UNITED STATES PATENTS

| | | | |
|---|---|---|---|
| 1,997,890 | 4/1935 | Wall | 74—569 XR |
| 2,090,178 | 8/1937 | Brickner | 90—62 |

MILTON KAUFMAN, Primary Examiner

F. D. SHOEMAKER, Assistant Examiner

U.S. Cl. X.R.

90—62